May 26, 1931.  J. L. RAY  1,807,173
FLUID PRESSURE RELAY MECHANISM
Filed May 4, 1927   2 Sheets-Sheet 1

WITNESS
E. Lutz

INVENTOR
J. L. Ray
BY
A. B. Reavis
ATTORNEY

Patented May 26, 1931

1,807,173

UNITED STATES PATENT OFFICE

JAMES L. RAY, OF SWARTHMORE, PENNSYLVANIA, ASSIGNOR TO WESTINGHOUSE ELECTRIC & MANUFACTURING COMPANY, A CORPORATION OF PENNSYLVANIA

FLUID PRESSURE RELAY MECHANISM

Application filed May 4, 1927. Serial No. 188,807.

My invention relates to a fluid pressure relay, more particularly to a relay operating the admission valve of a prime mover, and it has for its object to provide a relay having prompt and rapid closing action upon an abnormal change in the operating condition in accordance with which the prime mover is governed, such as, for example, an acceleration in speed due to dropping of the load of the prime mover.

Fluid pressure relays are commonly used to actuate the admission valve of a prime mover, such relays including a cylinder and a piston therein which is operatively connected to the admission valve. Biasing means is also usually provided which exerts a force on the admission valve or a part connected therewith, in a direction to close said valve. Such biasing means may be a spring or the disposition of the weights of the parts.

When a liquid is used to operate the relay, as is the general practise, the speed of operation of the relay is limited by the rate at which the liquid can flow through the relay. I have found that, particularly upon a sudden increase in speed of the prime mover, the spring, or weight tends to close the valve more rapidly than the fluid pressure, but the speed of its action is limited by the rate at which the liquid can flow into and out of the cylinder in which the operating piston reciprocates. In such case, the pressure of the liquid on the side of the piston toward which it is moving is greater than the pressure on the opposite side, due to the force exerted by the spring, the disposition of weight, or both.

In accordance with my invention, I provide a by-pass passage communicating with the opposite ends of the cylinder for the operating piston, which permits the fluid therein to flow from one end thereof to the other upon a sudden change in the operating condition. The liquid can then flow through said by-pass rapidly, due to the short distance of said by-pass, and the closing action of the relay is thereby more rapid.

Figure 1:
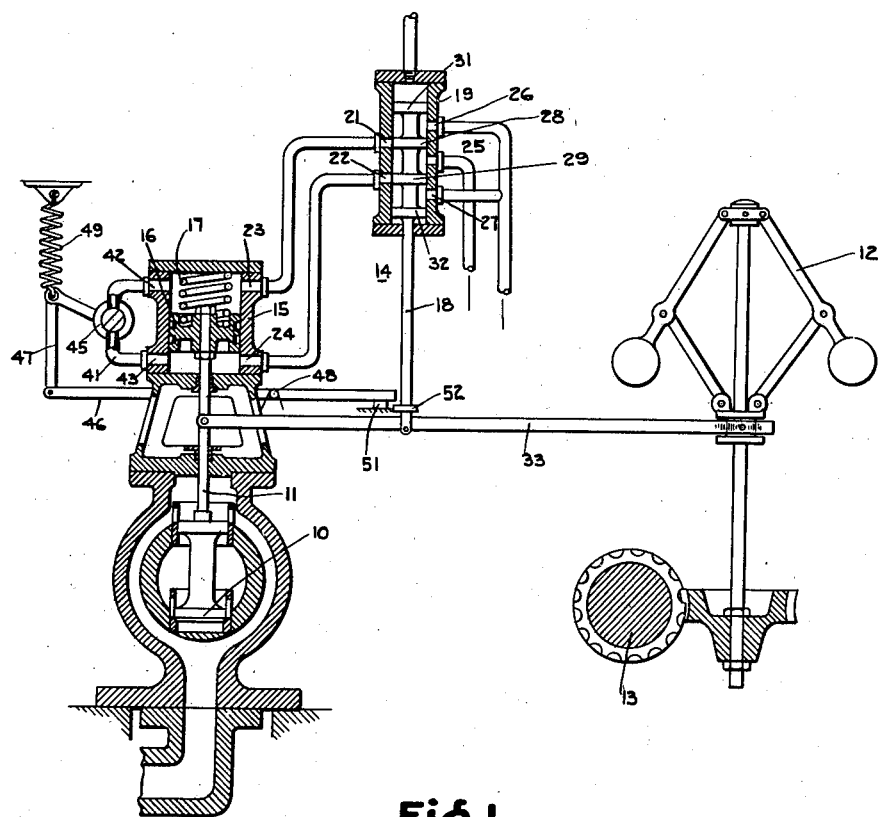
Figure 2:
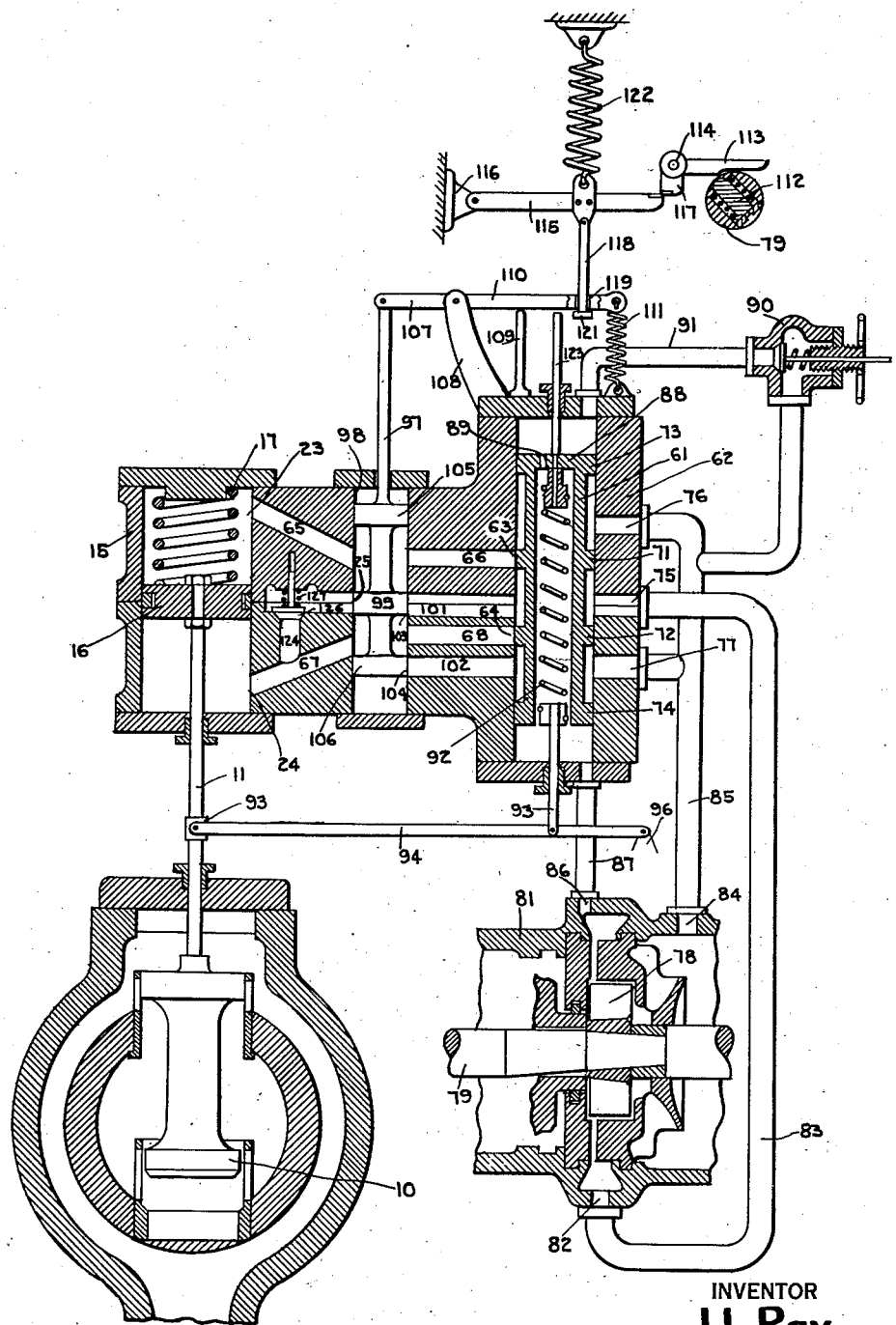

Apparatus exemplifying my invention is illustrated in the accompanying drawings in which:

Fig. 1 is a diagrammatic view, partly in section, of one embodiment of my invention; and, Fig. 2 is a diagrammatic view, partly in section, of another embodiment thereof.

Referring now to the drawings more in detail, I show, in Fig. 1, the admission valve 10 for a prime mover, connected to a valve stem or rod 11. A fly-ball speed governor 12 is driven from the prime mover shaft 13 and controls the admission of motive fluid to the prime mover. A fluid pressure relay 14 operatively connected to the governor 12 and the valve 10, operates the valve in accordance with the control of the governor.

The relay 14 includes a cylinder 15 and a piston 16. The piston 16 is operatively connected with the valve 10, being desirably secured to the upper end of the valve stem or rod 11.

A compression spring 17 is disposed in the upper end of the cylinder 15 with its lower end abutting against the piston 16. The spring thus exerts a force tending to close the valve 10. It will be apparent that any other means may be employed for biasing the valve to closed position.

The piston 16 is controlled by a pilot valve 18 operating in a pilot valve casing 19. The casing 19 has ports 21 and 22 communicating with ports 23 and 24, respectively, of the cylinder 15. The casing 19 is also provided with a port 25 through which motive fluid is supplied for operating the relay, and with ports 26 and 27 through which the motive fluid is discharged or exhausted. The pilot valve is provided with piston portions 28 and 29 which normally cover the ports 21 and 22, respectively, and it is also provided with piston portions 31 and 32 disposed beyond the discharge ports 26 and 27, respectively.

A lever 33 is connected at one end to the governor 12, and at its other end to the rod 11. Intermediate its ends it is connected to the pilot valve 18.

The above described construction is well known in the art.

I provide a by-pass 41 providing communication between the upper and lower ends of the cylinder 15, communicating therewith at the ports 42 and 43. This by-pass is controlled by a valve 45, operated by a lever 46 through an intermediate link 47. The lever 46 is pivoted to a stationary member at 48. A spring 49, secured at one end to a stationary member, exerts a force on the valve 45 to hold it in closed position. A stop or abutment 51 is also provided to limit the movement of the lever 46. The pilot valve 18 is provided with a shoulder 52, adapted to contact with the end of lever 46 upon a predetermined upward movement.

The operation of this embodiment is as follows:

Upon an increase in speed, the governor 12 raises the right hand end of lever 33. This moves the pilot valve 18 upwardly uncovering the ports 21 and 22. Motive fluid from the port 25 may now flow through ports 21 and 23 to the cylinder 15 to act on the upper side of piston 16, to move the latter downwardly to close the valve. The fluid beneath the piston 16 is discharged through the ports 24 and 22 to the discharge port 27. Downward movement of the rod 11 moves the lever 33 downwardly until pilot valve 18 is returned to its normal position in which it again closes ports 21 and 22.

Upon a decrease in speed of the prime mover, the governor 12 lowers the end of lever 33 connected thereto, and consequently moves the pilot valve 18 downwardly. Ports 21 and 22 are uncovered, the port 22 now being placed in communication with port 25, and port 21 being placed in communication with discharge port 26. Motive fluid now flows from port 22 to port 24 of the cylinder 15, where it acts on the lower side of piston 16 to open the valve 10 through the rod 11. The fluid above the piston 16 is discharged through the ports 23 and 21 to the pilot valve casing, and thence through discharge port 26. Upward movement of the rod 11 raises the end of lever 33 connected thereto until the pilot valve 18 is brought upwardly to its normal position when ports 21 and 22 are again closed.

The above described operation, takes place during normal variations in speed of the prime mover. Upon a sudden acceleration in speed, however, due to a dropping of the load of the prime mover or other cause, the speed with which the fluid can flow through the ports 25, 21 and 23 to lower the piston 16 is not as rapid as is desired, nor is the flow of fluid from beneath the piston 16 through the ports 24, 22 and 27. This is particularly true when a liquid, such as oil, is used to actuate the piston. The spring 17 exerts a force on the piston 16 which tends to move the piston more rapidly than the fluid flows through the cylinder, and consequently causes a greater pressure below the piston 16 than above the piston.

Upon an acceleration in speed above a predetermined rate, the pilot valve 18 is raised more than the normal distance. Consequently, it strikes the free end of the lever 46, and moves it against the tension of spring 49 to open the valve 45. The fluid beneath the piston 16, by reason of its greater pressure then flows through the by-pass 41 to the upper end of the cylinder. As the path of the oil through the by-pass 41 is much shorter than that through the relay and through the rest of the fluid pressure system through which it must go, it will be apparent that it can flow much more rapidly therethrough. The spring 17 is therefore effective to move the piston 16 and the valve 10 much more rapidly.

In Fig. 2, I show my invention applied to an overspeed trip valve. In this embodiment, also the relay is controlled by a fluid pressure governor instead of a fly-ball governor.

The prime mover is provided, as before, with an admission valve 10 secured to a valve stem or rod 11. The latter is connected to the piston 16 operating in the cylinder 15, having ports 23 and 24.

The pilot valve 61 operating in the valve casing 62 controls the movements of the piston 16. The valve casing is provided with a port 63 communicating with the port 23 through passages 65 and 66, and with a port 64 communicating with the port 24 through passages 67 and 68. The pilot valve 61 is provided with piston portions 71 and 72, which normally cover the ports 63 and 64, respectively, and also with piston portions 73 and 74 at the upper and lower ends thereof. The valve casing 62 is also provided with a port 75 through which fluid pressure is supplied, and with ports 76 and 77 through which fluid is discharged.

The pilot valve 61 in this case is also the pressure responsive element of the fluid pressure governor. Fluid pressure is developed by an impeller 78, mounted directly upon the rotor shaft 79 of the prime mover to be governed. A casing 81 is provided in which the impeller 78 rotates. The casing 81 is provided with a discharge opening 82 connected to a conduit 83 which provides communication with the port 75 of the valve casing 62. The casing 81 is also provided with an inlet opening 84 connected to conduit 85, which provides communication with the discharge ports 76 and 77 of the valve casing 62. A second discharge opening 86 is also provided in the casing 81, communicating with the lower end of the pilot valve casing 62 through a conduit 87, thereby subjecting the pilot valve 61 to the fluid pressure developed by the impeller 78.

The pilot valve 61 is provided with a hollow interior, and is open at the lower end and closed at the upper end as indicated at 88. The upper end 88 is provided with a restricted opening 89 through which fluid pressure from the lower end of the valve casing 62 may pass to the upper end thereof. A conduit 91 provides communication between the upper end of the casing 62 and the discharge conduit 85, through which the fluid passing through the restricted opening 89 may be discharged. A relief valve 90, however, is interposed in the conduit 91 and is adjustable to impose a back pressure on the fluid passing therethrough. A fluid pressure of any desired predetermined value is, therefore, maintained in the upper end of the pilot valve casing 62, and opposes the variable fluid pressure below the pilot valve.

A tension spring 92 is disposed within the hollow interior of the pilot valve 61, being secured at its upper end to the closed upper end 88 of the pilot valve, and at its lower end to the upper end of a link 93, which extends through the lower end wall of the pilot valve casing. The link 93 is pivoted at its lower end to a lever 94 at a point intermediate the ends thereof. The latter is pivoted at one end to a collar 95 secured to the valve stem 11, and at its other end to a stationary member 96.

A supplemental pilot valve 97 is provided, disposed within a valve casing 98. As will be noted from the drawing, the valve casing 98 provides communication between the passages 65 and 66, and also between the passages 67 and 68. A piston portion 99 of the supplemental pilot valve 97 normally prevents communication of the passages 65 and 66 with the passages 67 and 68. Supplemental passages 101 and 102 provide further communication between the valve casings 98 and 62, the ends of the passages opening into the casing 98, being designated as ports 103 and 104, respectively. The other ends of the passages 101 and 102 communicate with the valve casing 62 at points directly opposite or directly communicating with the ports 75 and 77, respectively. It will, therefore, be apparent that the passage 101 is always in communication with fluid pressure, without regard to the position of the pilot valve 61, and that the passage 102 is always in communication with a fluid discharge passage.

The pilot valve 97 is also provided with piston portions 105 and 106, preventing the escape of fluid from the upper and the lower ends, respectively, of the valve casing 98. The piston portions 99 and 106 in the normal position of the pilot valve 97, cover the ports 103 and 104. Upon downward movement of the pilot valve 97, however, the passage 101 is placed in communication with the passage 65 and the passage 102 is placed in communication with the passage 67. The pilot valve is pivoted to one arm of a lever 107, pivoted intermediate its ends to a bracket 108 extending from any stationary member. A stationary stop member 109 limits downward movement of the right-hand arm 110 of the lever 107, and a spring 111 tends to hold the arm 110 against said stop member.

The lever 107 may be actuated by an auto-stop governor weight 112, mounted in the shaft 79 of the rotor shaft, which flies outwardly and strikes the arm 113 of a bell crank lever 114 upon a predetermined overspeed of said rotor shaft. A lever 115 is pivoted at one end to a stationary member 116 and the other end thereof is held against upward movement by abutment against the arm 117 of the bell crank lever 114. The lever 115 has also secured thereto a link 118, which extends slidably through an opening 119 in the arm 110 of the lever 107, and which has an abutment 121 at the lower end thereof, by means of which it draws said arm 110 upwardly upon upward movement of the lever 115. A spring 122 exerts an upward force on the lever 115 to hold said lever against the arm 117 during normal speeds of the prime mover shaft, and drawing said lever upwardly to operate the lever 107 upon operation of the auto-stop governor 112.

The lever 107 is also adapted to be operated by movement of the pilot valve 61, by means of a stem 123 secured to the upper end of the pilot valve 61 and extending through the upper end wall of a valve casing 62. The stem 123 is so positioned that, upon sufficient upward movement of the upper end thereof, it will strike the arm 110 and move the same upwardly. The upper end of the stem 123 is spaced from the arm 110 during normal operation of the pilot valve, the extent of this space being equal to the upward movement of the pilot valve 61 during normal variations in speed of the prime mover.

A passage 124 provides communication between the passage 67 and the valve casing 98, the point of communication with the latter being designated as port 125, and being disposed immediately below the opening of the passage 65 into the valve casing. A check valve 126 is provided in the passage 124 and it is adapted to permit an upward flow of fluid through said passage but to prevent a downward flow. A light spring 127 tends to hold the check valve closed with a light force of, for example, one-quarter pound per square inch.

The operation of the above described embodiment of my invention is as follows: During normal operation of the prime mover while the load is constant, the pilot valve 61 is in the position shown in the drawing in which the piston portions 71 and 72 cover the ports 63 and 64, respectively. The piston 16 is thus held in stationary position. During such time the spring 17 exerts a downward force on the valve stem and the piston 16, but this force is resisted by the fluid below the piston 16, which cannot escape from the lower end of the cylinder 15.

Upon a normal increase in speed of the prime mover the pressure developed by the impeller 78 is increased, and the pilot valve 61 is moved upwardly until the increased deflection of the spring 92 increases the tension thereof to balance the increased pressure. The port 63 is now in communication with the port 75 and permits fluid pressure to flow to the upper end of the cylinder 15. The port 64 is in communication with the port 77 and permits the fluid from the lower end of the cylinder 15 to be discharged. As the piston 16 and valve stem 11 move downwardly, the lever 94 also moves downwardly, moving the pilot valve 61 down with it until the piston portions 71 and 72 again cover the ports 63 and 64, when movement of the relay ceases.

Assuming now that the load on the prime mover increases and that the speed is therefore reduced the lower pressure below the pilot valve 61 is now less than the sum of the back pressure above the pilot valve and the tension of the spring and the pilot valve is accordingly moved downwardly. The port 64 is now placed in communication with the port 75 and fluid pressure passes through the passages 68 and 67 to the lower end of the cylinder 15 to raise the piston 16 and further open the valve 10. The port 63 is in communication with the discharge port 76 and permits fluid from above the piston 16 to be discharged through passages 65 and 66. Upward movement of the piston 16 and the stem 11 moves the lever 94 upwardly which in turn moves the pilot valve 61 upwardly through the link 93 and the spring 92 until the ports 63 and 64 are again covered by the piston portions 71 and 72.

Assume now that the load of the prime mover is dropped which may be caused by opening the circuit breaker where the prime mover is driving an electrical generator. The speed of the shaft is now accelerated at a greater rate than during normal variations, and the fluid pressure beneath the pilot valve 61 is also greatly increased. The increased fluid pressure moves the pilot valve 61 upwardly a greater distance than before, and the stem 123 strikes the arm 110 of the lever 107 and moves the same upwardly. The supplemental pilot valve 97 is thereby moved downwardly, and the piston portion 99 uncovers the ports 125 and 103, and the piston portion 106 uncovers the port 104. The pressure of the fluid in the cylinder 15 beneath the piston 16 is greater than the fluid above said piston due to the force exerted on the piston, by the spring 17, or other biasing means, and the check valve 126 is accordingly opened. The fluid beneath the piston is now free to flow through the passages 67 and 124 and the port 125 to the valve casing 98 and then to passage 65 to the upper end of the cylinder 15. The upper end of the cylinder 15 is in communication with the port 75 through the passages 66 and 101, and the lower end of the cylinder 15 is in communication with the discharge port 77 through the passages 68 and 102. The fluid flowing to and from these ports, however, must flow through the conduits 85 and 83, and resistance to flow retards its speed so that it cannot flow into and out of the cyilnder 15 as rapidly as the spring 17 tends to move the piston 16. The passage 124 permits the fluid from beneath the piston 16 to be by-passed to the upper end of the cylinder 15 with but very little resistance, and the downward movement of the piston 16 is accordingly made much more rapid.

The lever 107 is also adapted to be operated by the auto-stop governor 112 when a speed of the prime mover above a safe limit is attained. The governor weight 112 strikes the arm 113 of the bell crank lever 114 releasing the lever 115 which under force of spring 122 draws the arm 110 of the lever 107 upwardly by means of a link 118. The piston portion 99 of the supplemental pilot valve 97 uncovers the port 125 as before and permits the spring 17 to close the valve 10.

From the above description it will be seen that I have provided a means of overcoming the retarding effects of fluid on the operating piston when a rapid closing action of the valve is desired permitting the valve spring to effect a rapid closing of the admission valve thereby preventing overspeeding of the prime mover.

While I have shown my invention in two forms it will be obvious to those skilled in the art that it is not so limited, but is susceptible of various other changes and modifications without departing from the spirit thereof and I desire, therefore, that only such limitations shall be placed thereupon as are imposed by the prior art or as are specifically set forth in the appended claims.

1. The combination with a prime mover having an admission valve and governor mechanism for controlling the valve of relay means for actuating said valve in accordance with the control of said governor mechanism and including a cylinder, an operating piston and a pilot valve for admitting liquid under pressure to said cylinder on each side of said piston and for discharging liquid therefrom, means for applying additional force for closing said valve, means for by-passing fluid from said cylinder on one side of said piston to said cylinder on the opposite side of said piston in a direction permitting said piston to move to close the valve and means for preventing by-passing of fluid through said means in the opposite direction.

2. The combination with a prime mover having an admission valve and governor mechanism for controlling the valve, of relay means for actuating said valve in accordance with the control of said governor mechanism, and including a cylinder, an operating piston and a pilot valve for admitting fluid under pressure to each end of said cylinder and for discharging fluid therefrom, means for applying additional force for closing said valve, and means operable upon abnormal acceleration of said prime mover for providing communication between the ends of said cylinder.

3. The combination with a governor for a prime mover responsive to an operating condition of said prime mover and a valve controlling flow of motive fluid through said prime mover, of a fluid pressure relay mechanism for actuating said valve in accordance with the control of said governor and including a cylinder, an operating piston and a pilot valve for admitting fluid under pressure to each end portion of said cylinder and for discharging fluid therefrom, means for applying additional force for closing said valve, and means for by-passing fluid from one end portion of said cylinder to the opposite end portion thereof upon abnormal change in said operating condition.

4. The combination with a governor for a prime mover responsive to an operating condition of said prime mover and a valve controlling flow of motive fluid through said prime mover, of a fluid pressure relay mechanism for actuating said valve in accordance with the control of said governor and including a cylinder, an operating piston and a pilot valve for admitting fluid under pressure to each end portion of said cylinder and for discharging fluid therefrom, means for applying additional force for closing said valve, means for by-passing fluid from one end portion of said cylinder to the opposite end portion thereof in a direction to permit closing of the valve upon abnormal change in said operating condition, and means for preventing by-passing of fluid in the other direction.

5. The fluid pressure relay mechanism comprising a cylinder, a piston therein, a pilot valve controlling the admission of motive fluid to said cylinder, means for applying additional force to move said piston in one direction, and means responsive to movement of the pilot valve beyond its normal travel for providing communication between the portions of said cylinder on opposite sides of said piston.

6. A fluid pressure relay mechanism comprising a cylinder, a piston therein, a pilot valve controlling the admission of motive fluid to said cylinder, means for applying additional force to move said piston in one direction, and means responsive to movement of the pilot valve beyond its normal travel for by-passing motive fluid from one end of said cylinder to the other end in a direction permitting the piston to move in said one direction, and means preventing reverse flow of said motive fluid.

7. The combination with a prime mover having an admission valve and a governor mechanism for controlling said admission valve, of relay means including a cylinder and a piston therein for operating the admission valve, a pilot valve controlling the admission of motive fluid to said cylinder, means for applying additional force in a direction close to the valve, and means responsive to movement of said pilot valve beyond its normal travel for by-passing fluid from one end of said cylinder to the other end in a direction permitting closing of the valve.

8. The combination with a prime mover having an admission valve and a governor mechanism for controlling said admission valve, of relay means including a cylinder and a piston therein for operating the admission valve, a pilot valve controlling the admission of motive fluid to said cylinder, means for applying additional force in a direction to close the valve, means responsive to movement of said pilot valve beyond its normal travel for by-passing fluid from one end of said cylinder to the other end in a direction permitting closing of the valve, and means preventing reverse flow of fluid through said last-mentioned means.

In testimony whereof, I have hereunto subscribed my name this 26th day of April, 1927.

JAMES L. RAY.